UNITED STATES PATENT OFFICE.

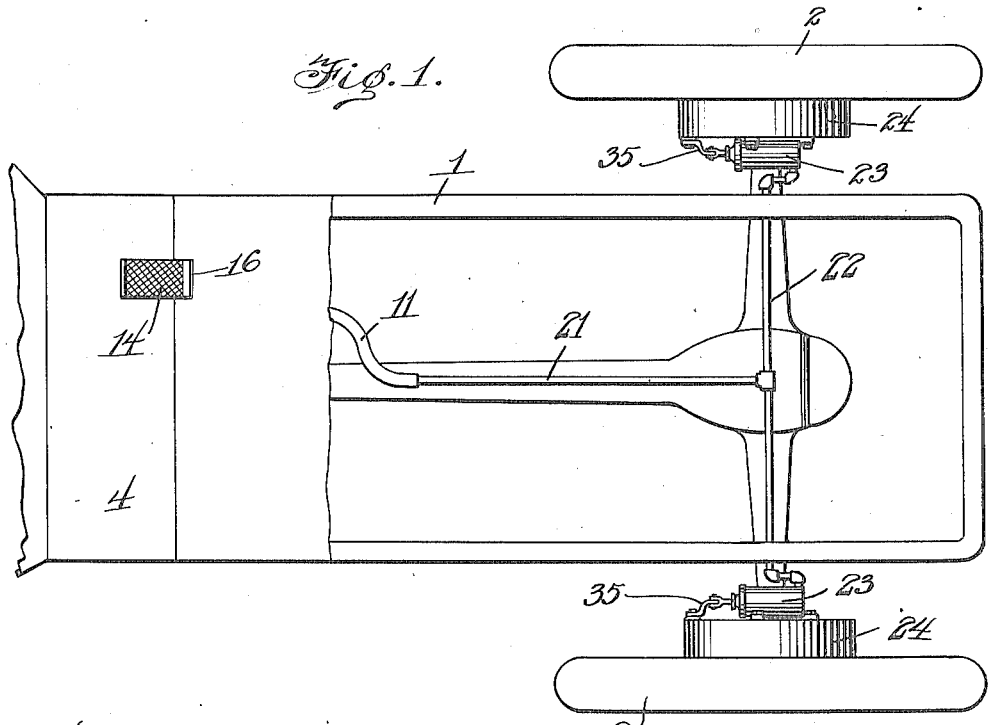
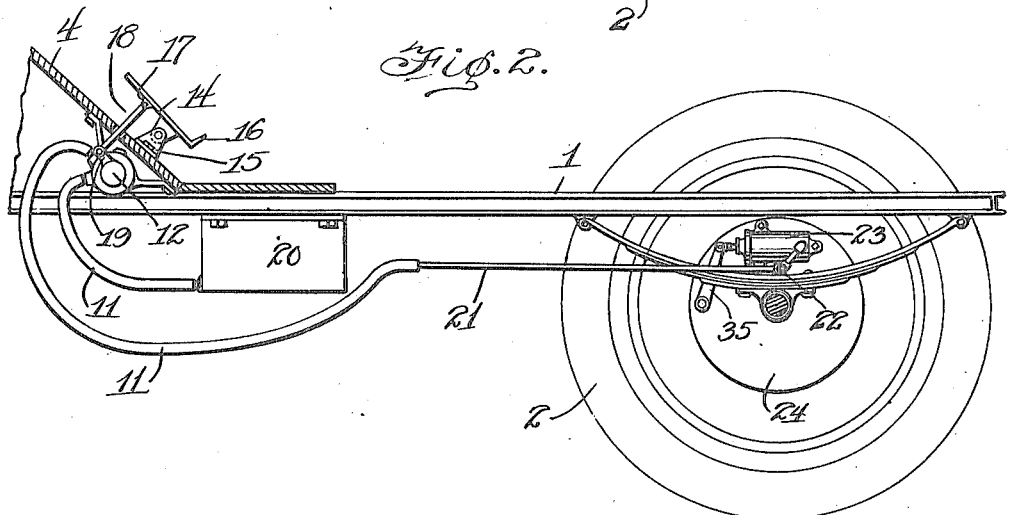

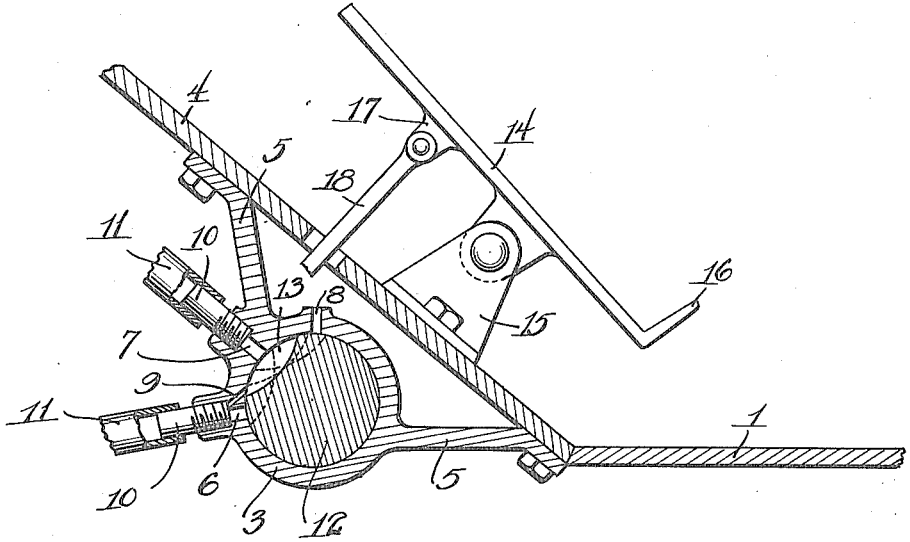
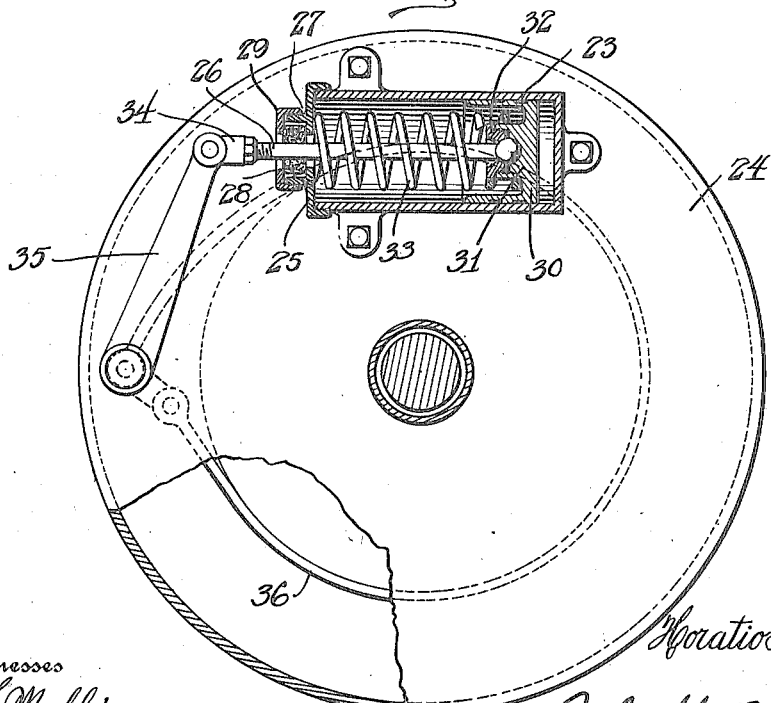

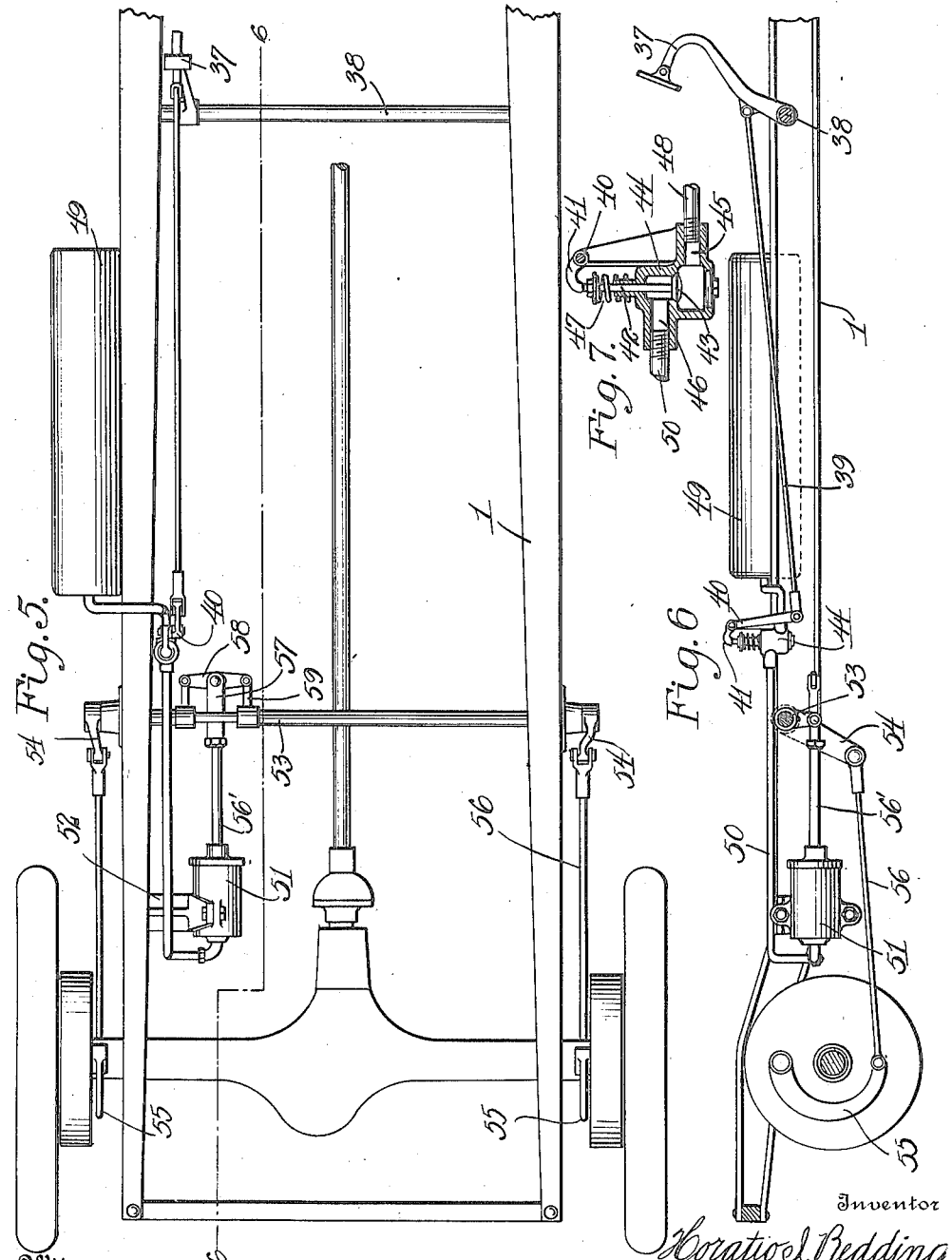

HORATIO I. REDDING, OF YORK, PENNSYLVANIA.

AIR-BRAKE.

1,248,912.　　　　　Specification of Letters Patent.　　Patented Dec. 4, 1917.

Application filed April 20, 1915. Serial No. 22,684.

*To all whom it may concern:*

Be it known that I, HORATIO I. REDDING, a citizen of the United States, residing at York, in the county of York and State of Pennsylvania, have invented certain new and useful Improvements in Air-Brakes, of which the following is a specification.

This inention relates to air brakes, and is principally designed for use on vehicles.

An object of the invention is to provide a single means for use in applying the brakes gradually for service stops, or abruptly for emergency stops.

Another object of the invention is to provide a simplified valve structure which is in communication with a source of pneumatic supply, whereby the brakes will be applied by the actuation of the valve, at the option of the operator.

A further object is to provide a valve operating medium which can be conveniently associated with any standard type of motor vehicle, and will not interfere with the successful operation of the vehicle nor appreciably encumber the same.

Other objects as well as the nature, characteristic features and scope of my invention will be more readily understood from the following description taken in connection with the accompanying drawings and pointed out in the claims forming a part of this specification.

Referring to the drawings:

Figure 1 is a top plan view of a portion of a vehicle embodying my invention,

Fig. 2 is a longitudinal sectional view of the same,

Fig. 3 is a detail enlarged fragmentary sectional view of the operating means and the valve which is controlled by the operating means, the latter controlling the air pressure.

Fig. 4 is a side elevational view of a brake drum, a portion thereof being broken away to disclose details, the brake drum having a portion of my improved brake applying mechanism associated therewith, part of the latter being shown in section, Fig. 5 is a top plan view, part being broken away, of a vehicle chassis embodying a modified form of my invention, Fig. 6 is a longitudinal sectional view taken on the line 6—6 of Fig. 5, and Fig. 7 is a modified sectional view of the valve structure as used in the modified form shown in Figs. 5 and 6.

In the drawings, in Figs. 1, 2, 3 and 4, I have illustrated the preferred form of this invention, in which views a portion of a vehicle body or chassis 1 is provided with which is associated in the usual manner, wheels 2, the latter representing the rear wheels of the vehicle, to which the brake structure is applied. It will be noted that the form of vehicle body used throughout the various views of the drawings, as well as the brake-drum and brake-band are of the usual configuration, so as to illustrate the applicability of my improved air brake system, on standard types of vehicles.

Referring first to the preferred form of this invention (shown in Figs. 1, 2, 3 and 4), a valve housing or casing 3 is provided which is detachably associated with the inclined floor-board 4 on the front of the vehicle body. The housing 3 embodies a cylindrical member which has radiating therefrom arms 5, the latter having their free terminals in connection with the floor board 4. The member 3 is tubular and has a plurality of openings formed therein as indicated at 6, 7 and 8, comprising the inlet, outlet and exhaust ports, respectively. A way 9 is formed in the member 3 and extends diagonally from the interior of the housing 3 to the inlet opening 6, to permit a limited supply of air to pass through the opening 6 and the passage 9 when the inner end of the opening 6 is closed. Each of the openings 6 and 7 has its outer end enlarged and screw-threaded for engagement with the screw-threaded end of a tubular nipple 10, the outer periphery of said nipples, beyond the screw-threaded portions thereof, being smooth and adapted for engagement with tubes 11.

Revolubly mounted in the casing 3 is a cylindrical valve member 12 which has a portion of its periphery removed to provide a segmental recess 13, the latter adapted for varied alinement with the openings 6, 7, 8 and 9. The valve and valve housing may of course, be constructed of any suitable material, metal being preferable in view of its durability and adaptability for snug engagement so as to preclude possibility of the pneumatic pressure, or other source of energy, being wasted.

A foot-pedal 14 is pivotally mounted upon a frame 15, the latter being detachably mounted upon the inclined boards 4 of the vehicle chassis, said pedal being provided with a heel abutment 16, in order to prevent casual displacement of the foot of the operator therefrom. An ear 17 depends from the lower face of the pedal 14, adjacent the forward terminal of the latter, which is in pivotal connection with one end of a link 18, the opposite end of the latter being pivotally engaged with a lug or ear 19, which is shown as formed upon the periphery of a portion of the valve 12, the latter being extended beyond the housing 3. From this formation, it is obvious that pressure upon the foot-pedal 14 will rotate the valve 12 in the housing 3, to dispose the recess 13 thereof in any desired position for permitting the entrance of the pneumatic energy into the valve housing 3, or to permit its being exhausted therefrom when desired.

One of the tubes 11, which is in engagement with the nipple 10 that extends from the opening 6, is in communication with a storage chamber 20, the latter containing air or any other suitable source of energy which is desired to be passed through the tube 11. The other tube 11 has the opposite end, from that which is in connection with the nipple 10, extending from the opening 7, in engagement with one end of a tubular pipe 21, the latter being preferably made of a rigid material, such as metal, and being in communication with a tributary 22, the latter extending in parallelism with the rear axle of the vehicle and having its terminals in communication with cylinders 23.

One of the cylinders 23 is detachably mounted upon the brake-drum 24 of each of the wheels 2, and in the present instance of the usual configuration, provided with a detachable cap 25 on one end, which has an opening therein to permit a piston rod 26 to be passed therethrough. The cap 25 is provided with an annular externally screw-threaded collar 27, which is adapted to receive packing material 28, in order to lubricate the piston rod 26, when the latter reciprocates through the cap 25. A closure 29 is detachably mounted upon the collar 27, and is provided with a central opening which alines with the opening in the cap 25, to likewise permit movement of the piston rod 26 therethrough. The openings in the cap 25 and closure 29 are of a diameter relatively larger than the piston rod 26, to permit lateral movement of said rod, which is desirable in view of the formation herein used, as will be subsequently described. A piston 30 is mounted for reciprocation in the cylinder 23, and is preferably tubular, having a concentric portion 31 mounted therein, which is adapted to receive the inner end of the piston rod 26, said inner end being enlarged and of a spherical contour to provide a universal connection between the piston rod and the concentric portion 31. A packing flange 32 is superposed on the spherical inner end of the piston rod 26, to prevent displacement of the latter, and likewise retain any suitable lubricating means in engagement with said spherical end, thereby insuring free movement of the latter at all times. A coil spring 33 is encircled on the shank of the piston rod 26, having one end thereof engaged about the outer periphery of the concentric extension 31, and the opposite end snugly engaged with the inner face of the cap 25, thereby normally holding the piston 30 in contact with the permanently closed end of the cylinder.

Each of the piston rods 26 is in detachable engagement with a bifurcated member 34, the branches of the bifurcation being in pivotal connection with one end of a lever 35, the opposite end of the latter being connected with a brake-band 36. The brake-band 36 is of the usual configuration and is engaged with the brake-drum 24 in the usual manner, that is to say, when it is desired to stop the brake-drum 24, the brake-band 36 is contracted on the drum, whereas when pressure is released from the brake-band, the latter will be expanded to permit free movement of the drum in the usual manner.

In Figs. 5, 6 and 7 a modified form of the invention is shown, which is likewise illustrated in connection with a standard form of vehicle body 1. In this form, however, a foot-pedal 37 is provided which is in rigid connection with a shaft 38, the latter extending transversely in the vehicle body 1 and rotatably mounted in the opposite sides of the latter. A valve operating rod 39 is provided which has one end thereof in pivotal connection with the foot-pedal 37, the opposite end being engaged with a valve operating mechanism, generally designated 40, which comprises a lever, the lower end of which is in connection with said rod 39, the opposite end being in connection with a finger 41. One end of said finger is superimposed upon the upper terminal of a valve-stem 42, the opposite end of said stem being in engagement with a valve 43.

The valve 43 is mounted for reciprocatory movement in a valve-casing 44, the latter being provided with a lateral inlet port 45, and a lateral outlet port 46. As illustrated in Fig. 7, the inlet port 45 is arranged in the lower end of the housing, while the outlet port 46 is arranged in the upper end of the housing, to arrange the inlet and outlet ports in non-alining relation. The valve 43 is interposed between the inlet and outlet ports of the casing 44, thereby normally closing communication through the housing closing communication through the housing. A coil-spring 47, on the valve-stem 42, normally exerts pressure on the latter, for holding the valve 43 snugly in engagement with a valve-seat which is formed in the housing, between the inlet and outlet ports 45 and 46 thereof.

A pipe 48 extends from the inlet port 45 and is in communication with a storage tank 49, the latter comprising a reservoir for compressed air or the like. A pipe 50 extends from the outlet port 46 and is in communication with a cylinder 51, the latter being pendently supported on the body of the vehicle 1, through the medium of a bracket 52. The cylinder 51 is identical in configuration with the cylinder 23, shown in Figs. 1, 2, 3 and 4, and for this reason has not been more elaborately illustrated in Figs. 5 and 6.

A shaft 53 is journaled in the vehicle body adjacent the rear end of the latter, and has levers 54 keyed on its opposite terminals, the latter extending beyond the opposite sides of the vehicle body, as illustrated to advantage in Fig. 5. It will therefore be appreciated that when the shaft 53 is operated, motion will be imparted to the levers 54 for applying the brake members 55, the latter being associated with the brake-drum in the usual manner, and adapted for association therewith in a manner well known in the art. Motion is transmitted from the lever 54 to the brake members 55 by links 56, the latter being of any suitable configuration and preferably made of metal.

In order to rotate the shaft 53, suitable means are provided, which are in operative communication with the piston rod 56', said means embodying a plate 57, which is secured approximately midway the ends of a cross-head 58. The cross-head in turn has its opposite ends engaged with arms 59, the latter being in connection with the shaft 53.

Referring to the operation of the form shown in Figs. 1, 2, 3 and 4, it will be obvious that when pressure is exerted upon the foot-pedals 14, that the valve 12 will be operated, to dispose the recess 13 thereof in alinement with the desired opening of the housing 3, consistent with whether it is desired to introduce air into the housing, for actuating the piston 30, or to exhaust the air from the housing, in which instance the lever 14 is in a neutral position. Assuming that it is desired to operate the foot-pedal 14 for service stops, sufficient pressure only is exerted upon said foot-lever, to actuate the valve 12, until the recess 13 thereof is in alinement with the opening 9 and the opening 7. In this position, only a limited volume of air is permitted to pass into the casing or housing 3, which is immediately conducted through the opening 7, subsequently through the tube 11 and into the cylinder 23, to operate the piston 30 in said cylinder. This operation will contract the brake-band 36 upon the drum 24, thereby retarding the speed of the brake-drum in a gradual manner. When it is desired to abruptly stop the vehicle, as in emergency cases, pressure is exerted on the foot-pedal 14, to actuate the latter through its entire phase of movement, thus operating the valve 12, so that the recess 13 thereof will be alined with the opening 6, permitting a free and unretarded volume of air to pass through the opening 6 and into the casing 3. It will be noted that the recess 13 of the valve 12 is sufficiently large to span the space between the opening 6 and the opening 7, to directly conduct the air, which is passed through the opening 6, into the opening 7, thereby imparting movement to the piston 30, to rapidly and forcibly contract the band 36 on the drum 24, when an abrupt stop is desired.

In the form of the invention as shown in Figs. 5, 6 and 7, when it is desired to stop the vehicle, pressure is exerted on the foot-pedal 37, which operation will impart movement to the valve 43 through the instrumentality of the rod 39 and the mechanism 40, thereby opening communication from the storage tank 49 to the cylinder 51, in order to actuate a piston on the interior of the latter. The movement of the piston will impart movement to the shaft 53, in view of the connection between the piston rod 56' and said shaft 53, heretofore described, the movement of said shaft imparting movement to the brake member 55, also heretofore fully described. The volume of air which is permitted to pass into the cylinder 51 in this instance, is left entirely to the discretion of the operator, since this can be regulated only by the exertion of pressure which is brought to bear on the foot-lever 37. However, this type of pneumatic brake operating means, is especially desirable for service stops, in which instance successive operations of the foot-pedal 37 will be made, so as to intermittently introduce air into the cylinder 51 for gradually applying the brake members 55. As soon as pressure is released from the foot pedal 37 the air will be permitted to exhaust through a recess 58 in the valve stem.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

Having thus fully described my invention, what I claim as new and desire to secure by Letters Patent is:

An air brake for vehicles including a tubular casing provided with inlet, brake cylinder and exhaust openings, said inlet opening having a tributary leading therefrom and terminating adjacent said brake cylinder opening, a valve mounted in said casing and provided with a single recess, said valve being rotatable to aline said recess with said inlet and brake cylinder openings for emergency stops of the vehicle; said recess also being registrable with the tributary of the inlet opening and said brake cylinder opening for service stops of the vehicle.

In testimony whereof I affix my signature in presence of two witnesses.

HORATIO I. REDDING.

Witnesses:

STANLEY P. KOURAKOS,
JOHN A. RITTER.